US008947550B2

(12) United States Patent
Minato

(10) Patent No.: US 8,947,550 B2
(45) Date of Patent: Feb. 3, 2015

(54) IMAGE PROCESSING APPARATUS WITH FRAME CONVERSION, AND METHOD OF CONTROLLING SAME

(75) Inventor: Yoshihiko Minato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 13/074,646

(22) Filed: Mar. 29, 2011

(65) Prior Publication Data
US 2011/0249135 A1 Oct. 13, 2011

(30) Foreign Application Priority Data

Apr. 8, 2010 (JP) ................................ 2010-089302
Jan. 13, 2011 (JP) ................................ 2011-004708

(51) Int. Cl.
H04N 5/228 (2006.01)
H04N 5/235 (2006.01)
H04N 5/232 (2006.01)
H04N 5/243 (2006.01)
H04N 5/57 (2006.01)
H04N 7/01 (2006.01)
H04N 21/431 (2011.01)
H04N 21/4402 (2011.01)

(52) U.S. Cl.
CPC ........... *H04N 5/235* (2013.01); *H04N 5/23232* (2013.01); *H04N 5/2355* (2013.01); *H04N 5/243* (2013.01); *H04N 5/57* (2013.01); *H04N 7/0127* (2013.01); *H04N 21/4318* (2013.01); *H04N 21/440281* (2013.01)
USPC .................................. 348/222.1; 375/240.16

(58) Field of Classification Search
CPC ........ H04N 9/045; H04N 7/013; H04N 7/014
USPC .................................. 348/222.1; 375/240.16
See application file for complete search history.

(56) References Cited

U.S. PATENT DOCUMENTS

| 5,974,190 A * | 10/1999 | Maeda et al. ................. 382/255 |
| 2005/0286804 A1* | 12/2005 | Hong ............................ 382/300 |
| 2006/0250520 A1* | 11/2006 | Han et al. ..................... 348/398.1 |

(Continued)

FOREIGN PATENT DOCUMENTS

| JP | 2003-046857 | 2/2003 |
| JP | 2008-281631 A | 11/2008 |

(Continued)

OTHER PUBLICATIONS

The above references were cited in a Sep. 11, 2012 Japanese Office Action, which is enclosed without an English Translation, that issued in Japanese Patent Application No. 2011-004708.

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

An image processing apparatus according to the present invention, comprises: a frame rate conversion unit that generates an interpolated frame image which interpolates an input frame image constituting an input video, and outputs the input frame image and the interpolated frame image alternately; and an HDR video generation unit that performs processing to enhance gradation of an image in a low brightness area, for the input frame image which is output from the frame rate conversion unit, and performs processing to enhance gradation of an image in a high brightness area, for the interpolated frame image.

18 Claims, 13 Drawing Sheets

(56) References Cited

U.S. PATENT DOCUMENTS

| | | | |
|---|---|---|---|
| 2008/0069478 A1* | 3/2008 | Ohwaki et al. | 382/300 |
| 2008/0218635 A1* | 9/2008 | Tsuruoka | 348/607 |
| 2008/0226197 A1* | 9/2008 | Saga | 382/300 |
| 2008/0246713 A1* | 10/2008 | Lee et al. | 345/89 |
| 2008/0284768 A1* | 11/2008 | Yoshida et al. | 345/208 |
| 2009/0022411 A1* | 1/2009 | Inoue et al. | 382/239 |
| 2010/0091042 A1* | 4/2010 | Inoue | 345/690 |
| 2011/0057945 A1* | 3/2011 | Matsubara | 345/589 |
| 2011/0090264 A1* | 4/2011 | Tatsumi | 345/690 |

FOREIGN PATENT DOCUMENTS

| | | | | |
|---|---|---|---|---|
| JP | 2009-258269 A | | 11/2009 | |
| JP | 2009258269 A | * | 11/2009 | G09G 3/36 |
| WO | WO 2008146424 A1 | * | 12/2008 | G09G 3/36 |
| WO | WO 2009130988 A1 | * | 10/2009 | G09G 5/36 |

\* cited by examiner

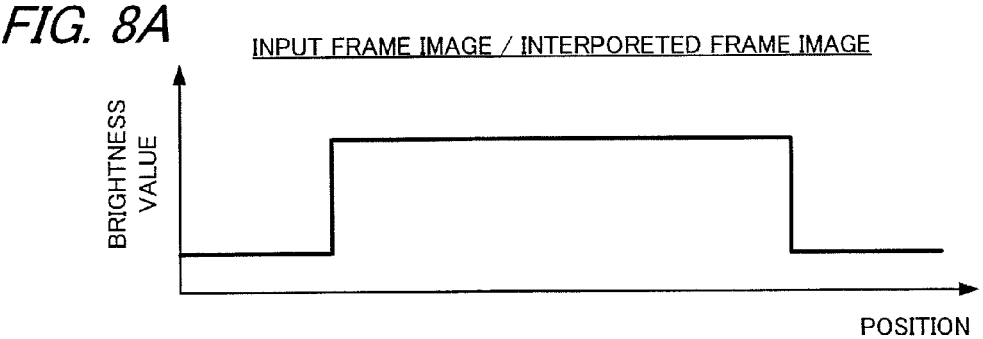
FIG. 8A  INPUT FRAME IMAGE / INTERPORETED FRAME IMAGE
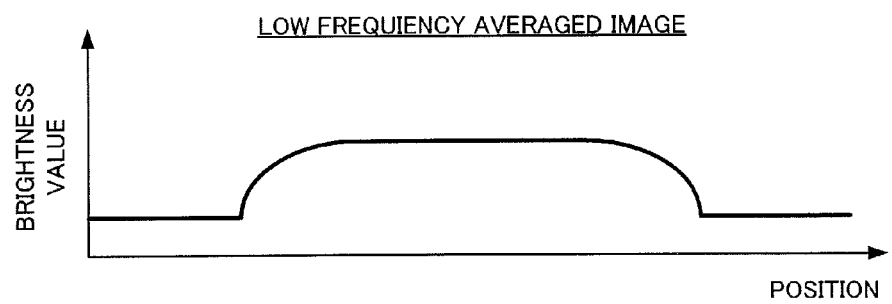
FIG. 8B  LOW FREQUIENCY AVERAGED IMAGE
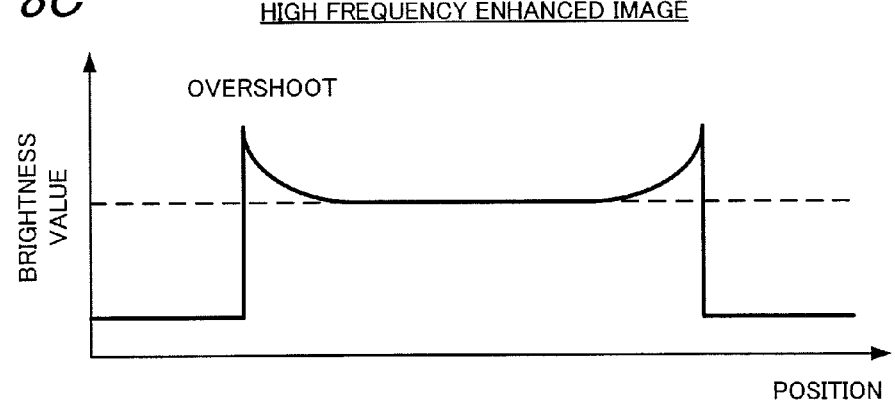
FIG. 8C  HIGH FREQUENCY ENHANCED IMAGE

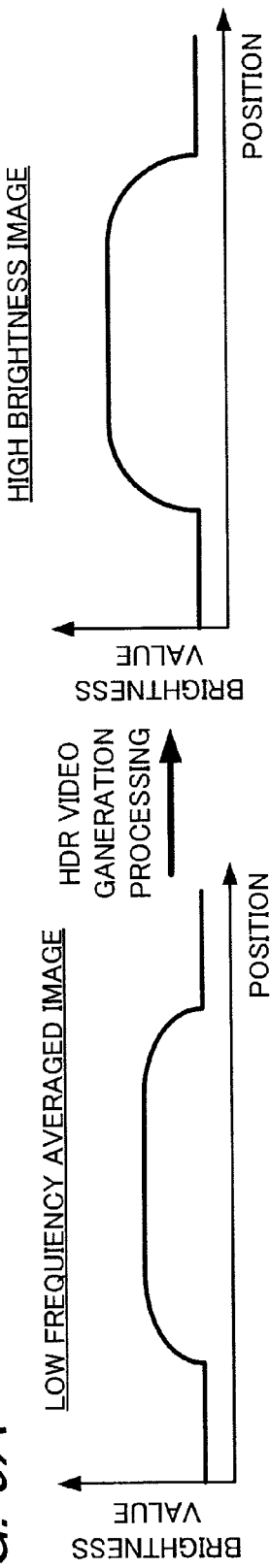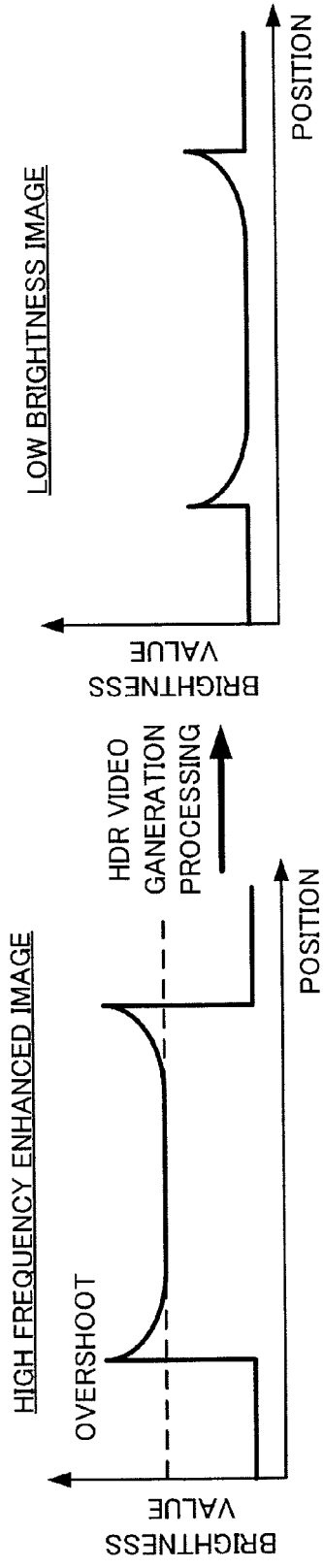
FIG. 9A
FIG. 9B

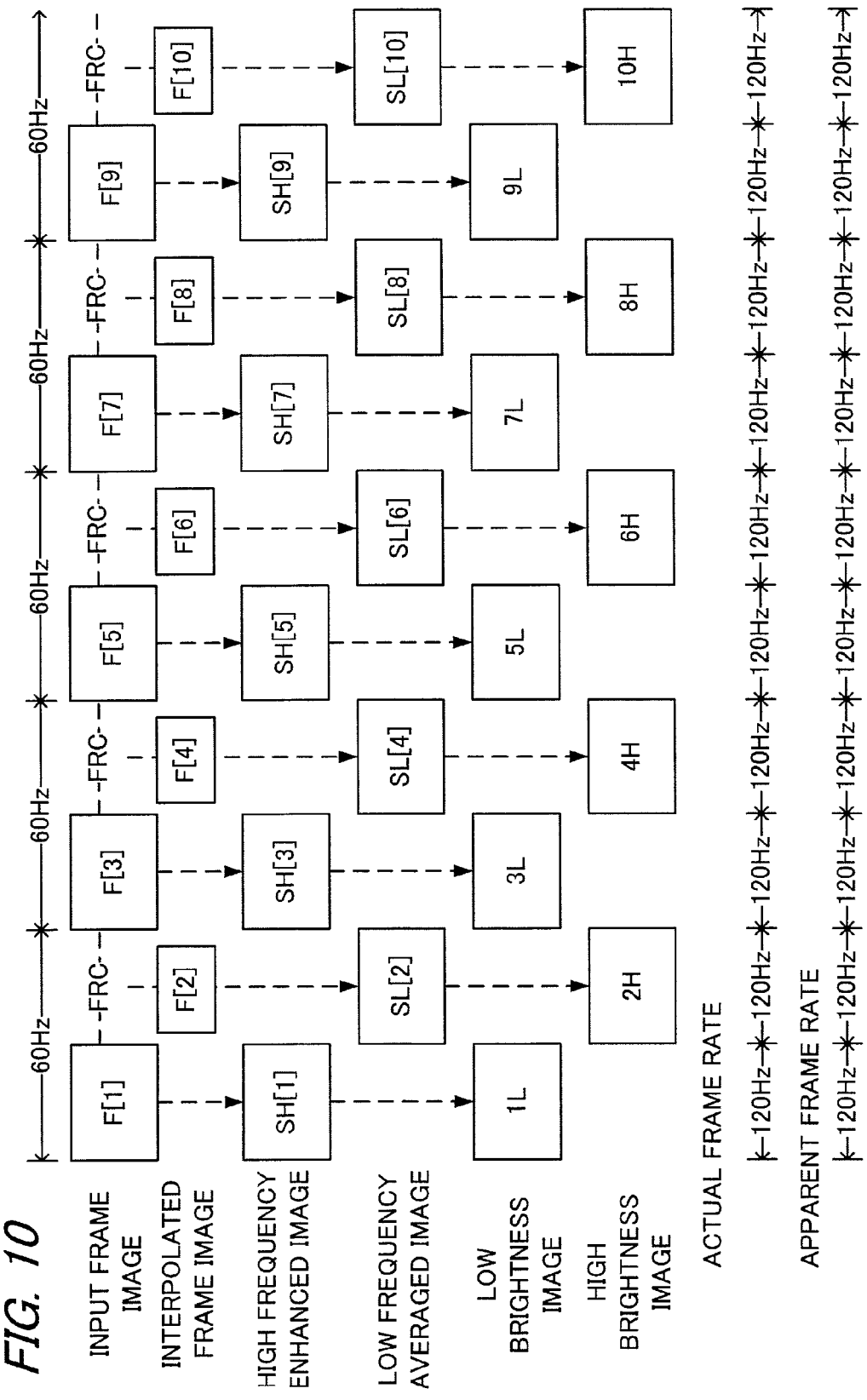

FIG. 11

INPUT FRAME IMAGE: F[1] — 60Hz — F[2] — 60Hz — F[3] — 60Hz — F[4] — 60Hz — F[5] — 60Hz —

HIGH BRIGHTNESS IMAGE: 1H, 2H, 3H, 4H, 5H

LOW BRIGHTNESS IMAGE: 1L, 2L, 3L, 4L, 5L

ACTUAL FRAME RATE: 120Hz — 120Hz — 120Hz — 120Hz — 120Hz — 120Hz — 120Hz — 120Hz — 120Hz — 120Hz

APPARENT FRAME RATE: 60Hz — 60Hz — 60Hz — 60Hz — 60Hz

FIG. 13B HIGH BRIGHTNESS IMAGE
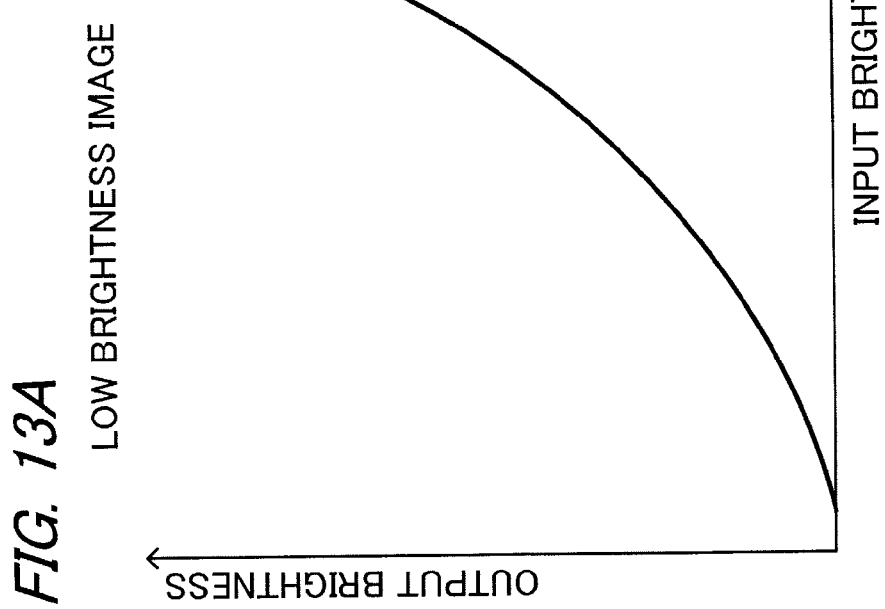
FIG. 13A LOW BRIGHTNESS IMAGE

IMAGE PROCESSING APPARATUS WITH FRAME CONVERSION, AND METHOD OF CONTROLLING SAME

BACKGROUND OF THE INVENTION

1. Field of the Invention

The present invention relates to an image processing apparatus and a method of controlling the image processing apparatus.

2. Description of the Related Art

A technology to express high dynamic range (HDR) video is disclosed in Japanese Patent Application Laid-Open No. 2003-046857, for example. In concrete terms, Japanese Patent Application Laid-Open No. 2003-046857 discloses a technology for generating one frame of an HDR video from one frame of an original image by alternately using two different algorithms.

On the other hand, a dynamic range can be apparently improved by generating an image (low brightness image) in which gradation of an image in a high brightness area is enhanced and an image (high brightness image) in which gradation of an image in a low brightness area is enhanced, from the imput image, and alternately displaying these two images. Such a video of which dynamic range is improved is called an "HDR video" hereinbelow. However if an HDR video is generated from the input video by this method, an apparent frame rate remains as the frame rate of the input video, even if the frame rate of the HDR video is double that of the frame rate of the input video, as shown in FIG. 11. If an HDR video is generated by the above mentioned method after converting the frame rate on the input video (generating interpolated frame images), the frame rate of the HDR video becomes high, as shown in FIG. 12. In concrete terms, the frame rate of the HDR video becomes double that of the frame rate of the input video for which frame rate was converted. Therefore the frame rate of the HDR video may exceed the frame rate of a video that can be displayed on a display.

SUMMARY OF THE INVENTION

The present invention provides a technology to improve the dynamic range of a video after converting the frame rate without increasing the frame rate, using a simple configuration.

A first aspect of the present invention is an image processing apparatus, comprising:

a frame rate conversion unit that generates an interpolated frame image which interpolates an input frame image constituting an input video, and outputs the input frame image and the interpolated frame image alternately; and an HDR video generation unit that performs processing to enhance gradation of an image in a low brightness area, for the input frame image which is output from the frame rate conversion unit, and performs processing to enhance gradation of an image in a high brightness area, for the interpolated frame image.

A second aspect of the present invention is an image processing apparatus, comprising:

a frame rate conversion unit that generates an interpolated frame image which interpolates an input frame image constituting an input video, and alternately outputs the input frame image and the interpolated frame image;

an image processing unit that extracts high frequency components of the input frame image which is output from the frame rate conversion unit in order to generate a high frequency component image, and extracts low frequency components of the interpolated frame image which is output from the frame rate conversion unit in order to generate a low frequency component image; and an HDR video generation unit that performs processing to enhance gradation of an image in a high brightness area, for the high frequency component image, and performs processing to enhance gradation of an image in a low brightness area, for the low frequency component image.

A third aspect of the present invention is a method for controlling an image processing apparatus, comprising:

a frame rate conversion step of generating an interpolated frame image which interpolates an input frame image constituting an input video, and alternately outputting the input frame image and the interpolated frame image; and an HDR video generation step of performing processing to enhance gradation of an image in a low brightness area, for the input frame image which is output in the frame rate conversion step, and performing processing to enhance gradation of an image in a high brightness area, for the interpolated frame image.

A fourth aspect of the present invention is a method for controlling an image processing apparatus, comprising:

a frame rate conversion step of generating an interpolated frame image which interpolates an input frame image constituting an input video, and alternately outputting the input frame image and the interpolated frame image;

an image processing step of extracting high frequency components of the input frame image which is output in the frame rate conversion step in order to generate a high frequency component image, and extracting low frequency components of the interpolated frame image which is output in the frame rate conversion step in order to generate a low frequency component image; and an HDR video generation step of performing processing to enhance gradation of an image in a high brightness area, for the high frequency component image, and performing processing to enhance gradation of an image in a low brightness area, for the low frequency component image.

According to the present invention, the dynamic range of a video after converting the frame rate can be improved without increasing the frame rate using a simple configuration.

Further features of the present invention will become apparent from the following description of exemplary embodiments with reference to the attached drawings.

BRIEF DESCRIPTION OF THE DRAWINGS

FIG. 8A to FIG. 8C are diagrams depicting an example of a drive distribution processing according to Example 2;

FIG. 9A and FIG. 9B are diagrams depicting an example of HDR video generation processing according to Example 2;

FIG. 10 is a diagram depicting an example of a series of processings by the image processing apparatus according to Example 2;

FIG. 11 is a diagram depicting a problem of the present invention;

FIG. 13A and FIG. 13B are diagrams depicting an example of LUT, which is used for the HDR video generation processing according to this example.

DESCRIPTION OF THE EMBODIMENTS

Example 1

In this example, the dynamic range is apparently improved by generating a video, where a frame image (L) in which gradation of an image in a high brightness area is enhanced and a frame image (H) in which gradation of an image in a low brightness area is enhanced are arranged alternately, from an input video. Hereafter a video where the frame image L and the frame image H are alternately arranged is called a "high dynamic range (HDR) video".

Now an image processing apparatus according to this example and a control method thereof will be described. The image processing apparatus according to this example generates HDR video.
(Configuration)

Figure 1:
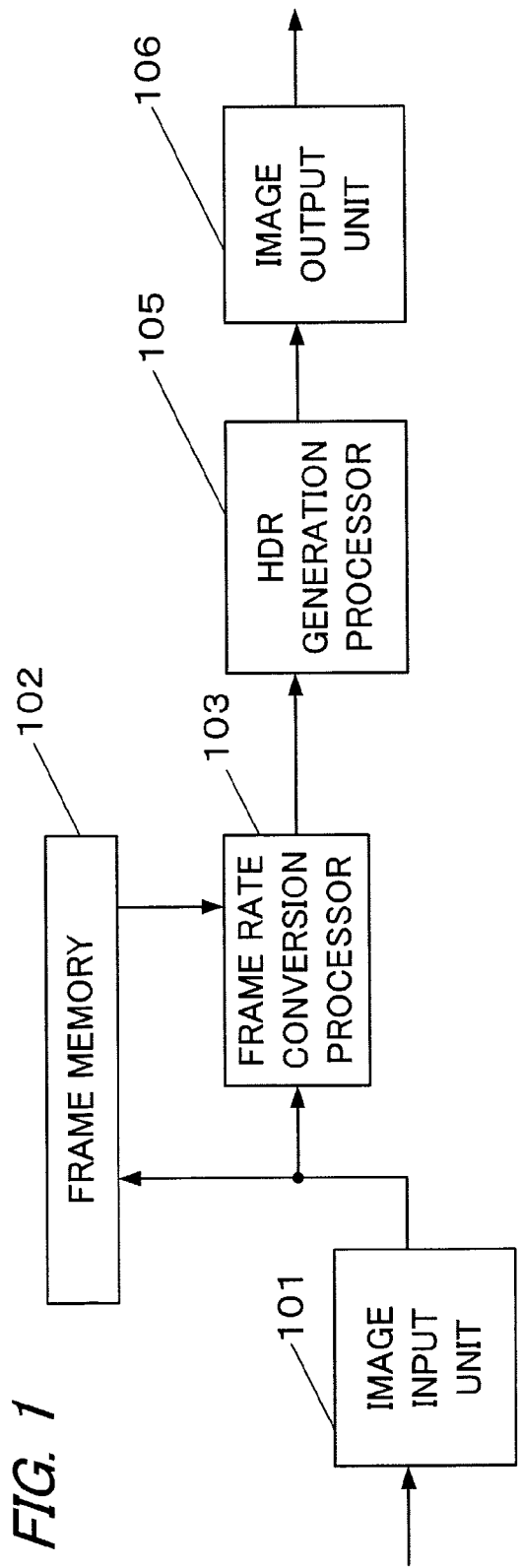
FIG. 1 is a diagram depicting an example of a configuration of an image processing apparatus according to Example 1.

FIG. 1 is a block diagram depicting an example of a general configuration of the image processing apparatus according to this example.

An image input unit 101 outputs a frame image (data) constituting a video which was input (input video) to a frame rate conversion processor 103 and a frame memory 102. Hereafter a frame image constituting an input video is called an "input frame image".

The frame memory 102 stores one frame of the input frame image.

The frame rate conversion processor 103 detects a motion vector from an input frame image from the image input unit 101, and an input frame image stored in the frame memory 102 (input frame image which is in the previous frame of the input frame image from the image input unit 101). The frame rate conversion processor 103 then generates an interpolated frame image, which interpolates the two input frame images, using the detected motion vector. For the method of generating an interpolated frame image using a motion vector, a publicly known technology is used, hence a detailed description is omitted here. The frame rate conversion processor 103 alternately outputs the input frame image and the interpolated frame image (frame rate conversion unit).

An HDR generation processor 105 performs processing to enhance gradation of an image in a low brightness area for an input frame image which is output from the frame rate conversion processor 103, and performs processing to enhance gradation of an image in a high brightness area for an interpolated frame image (HDR video generation unit). Thereby the input video is converted into an HDR video, of which dynamic range is apparently improved. The low brightness area and the high brightness area are an area lower than or equal to a predetermined brightness value (e.g. intermediate value of the input brightness) and an area higher than or equal to a predetermined brightness value (e.g. intermediate value of the input brightness) respectively. The input brightness may be equally divided into a plurality of (three or more) brightness ranges, where a low brightness area is an area in a brightness range on the lowest brightness side, and a high brightness area is an area in a brightness range on the highest brightness side. The gradation of an image in the low brightness area and the high brightness area can be enhanced using a lookup table (LUT), for example. FIG. 13A and FIG. 13B show examples of LUT. FIG. 13A and FIG. 13B are diagrams representing a LUT with a gamma correction function, where the abscissa is the input brightness (brightness value before conversion), and the ordinate is the output brightness (brightness value after conversion). FIG. 13A is an example of a LUT (function) which is used for enhancing the gradation of an image in a high brightness area. By using the LUT in FIG. 13A, an input image can be converted into an image of which gradation in the high brightness area is more closely expressed. In concrete terms, the gradation of an image increases as the brightness of the area is higher, and the gradation of an image decreases as the brightness of the area is lower. FIG. 13B is an example of a LUT (function) which is used for enhancing the gradation of an image in a low brightness area. By using the LUT in FIG. 13B, an input image can be converted into an image of which gradation in the low brightness area is more closely expressed. In concrete terms, the gradation of an image increases as the brightness of the area is lower, and the gradation of an image decreases as the brightness of the area is higher. An image for which processing to enhance the gradation in a high brightness area has lower brightness than the original image, therefore this image is called a "low brightness image". An image for which processing to enhance the gradation in a low brightness area has higher brightness than the original image, therefore this image is called a "high brightness image".

An image output unit 106 outputs an HDR video, which is output from the HDR generation processor 105, to another image processing apparatus, display apparatus (display unit), and such a storage unit as a memory (image output unit).
(Generation of HDR video)

Figure 2:
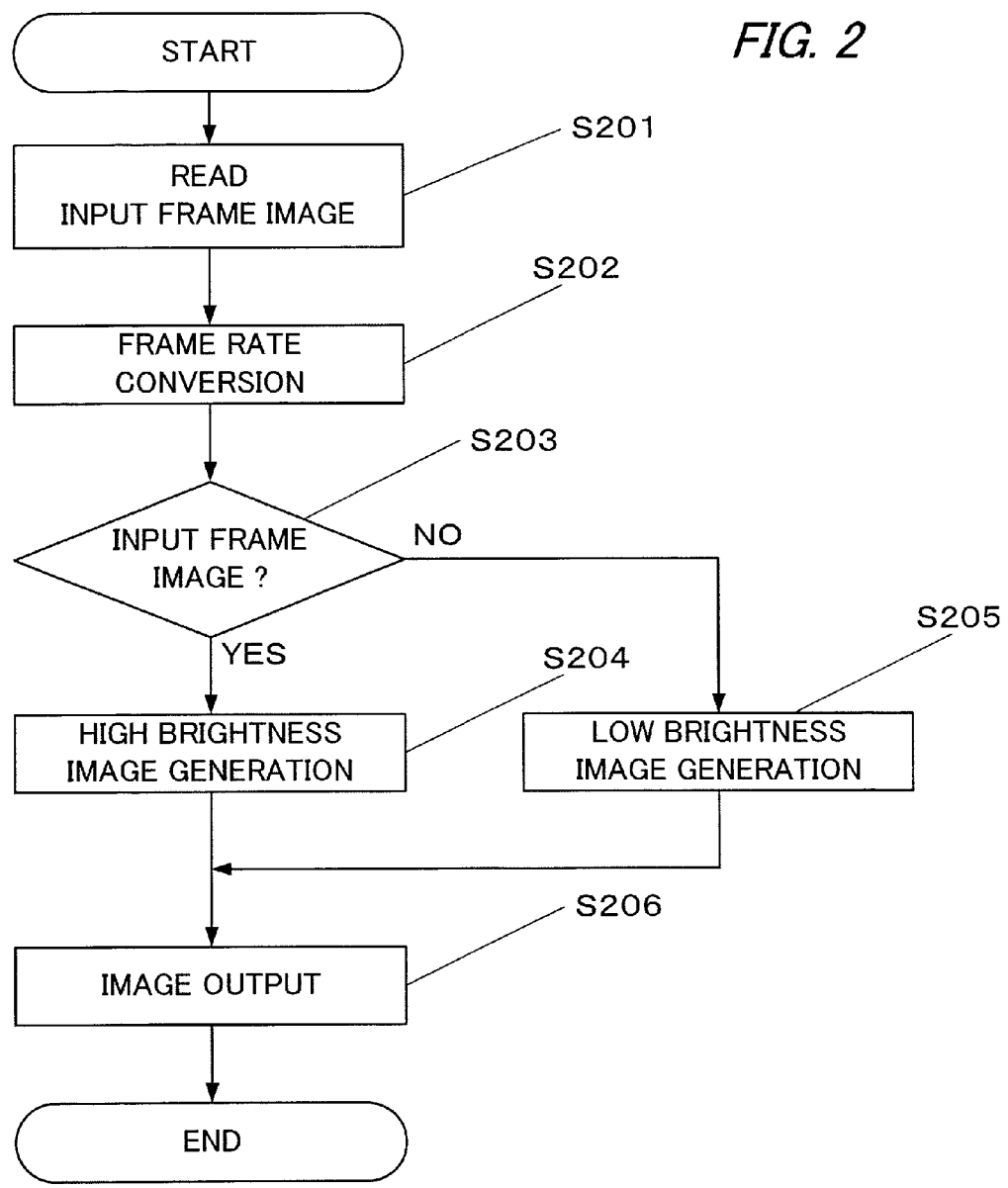
FIG. 2 is a flow chart depicting an example of a processing flow of the image processing apparatus according to Example 1.

A processing flow, until an HDR video is generated, will be described with reference to the flow chart in FIG. 2.

First the image input unit 101 writes an input frame image to a frame memory 102, and outputs the input frame image to the frame rate conversion processor 103 (S201).

Then the frame rate conversion processor 103 detects a motion vector from the input frame image from the image input unit 101 and the input frame image in the previous frame read from the frame memory 102 (previous frame image). Based on the detected motion vector, an interpolated frame image is generated, the frame rates of the input frame image and the interpolated frame image are doubled, and the input frame image and the interpolated frame image are alternately output (S202: frame rate conversion processing (FRC)).

Then the HDR generation processor 105 determines whether a frame image, which is output from the frame rate conversion processor 103, is an input frame image or an interpolated frame image (S203). This determination can be based on an identification signal superposed on the frame image (e.g. identification information to indicate an input frame image or an interpolated frame image). By the frame rate conversion processor 103 adding the identification information to the interpolated frame image, the HDR generation processor 105 can determine whether the identification information to indicate an interpolated frame image is attached to each frame image. An input frame image or an interpolated frame image may be determined by predetermining which image to be input first (determination becomes possible since an input frame image and an interpolated frame image are alternately output).

If the frame image, which is output from the frame rate conversion processor 103, is an input frame image (S203: YES), this image is converted into a high brightness image, and is output to the image output unit 106 (S204).

If the frame image, which is output from the frame rate conversion processor 103, is an interpolated frame image (S203: NO), this image is converted into a low brightness image, and is output to the image output unit 106 (S205). The processing in S204 and S205 is referred to as "HDR conversion processing".

Then the image output unit 106 outputs an image generated by the HDR generation processor 105 (high brightness image, low brightness image) to another image processing apparatus, display apparatus and such a storage unit as a memory (S206: video output processing). The image output unit 106 alternately outputs the high brightness image and the low brightness image generated by the HDR generation processor 105, and displays the images on the di splay apparatus (display unit), whereby the dynamic range of the input video is apparently improved.

Figure 3:
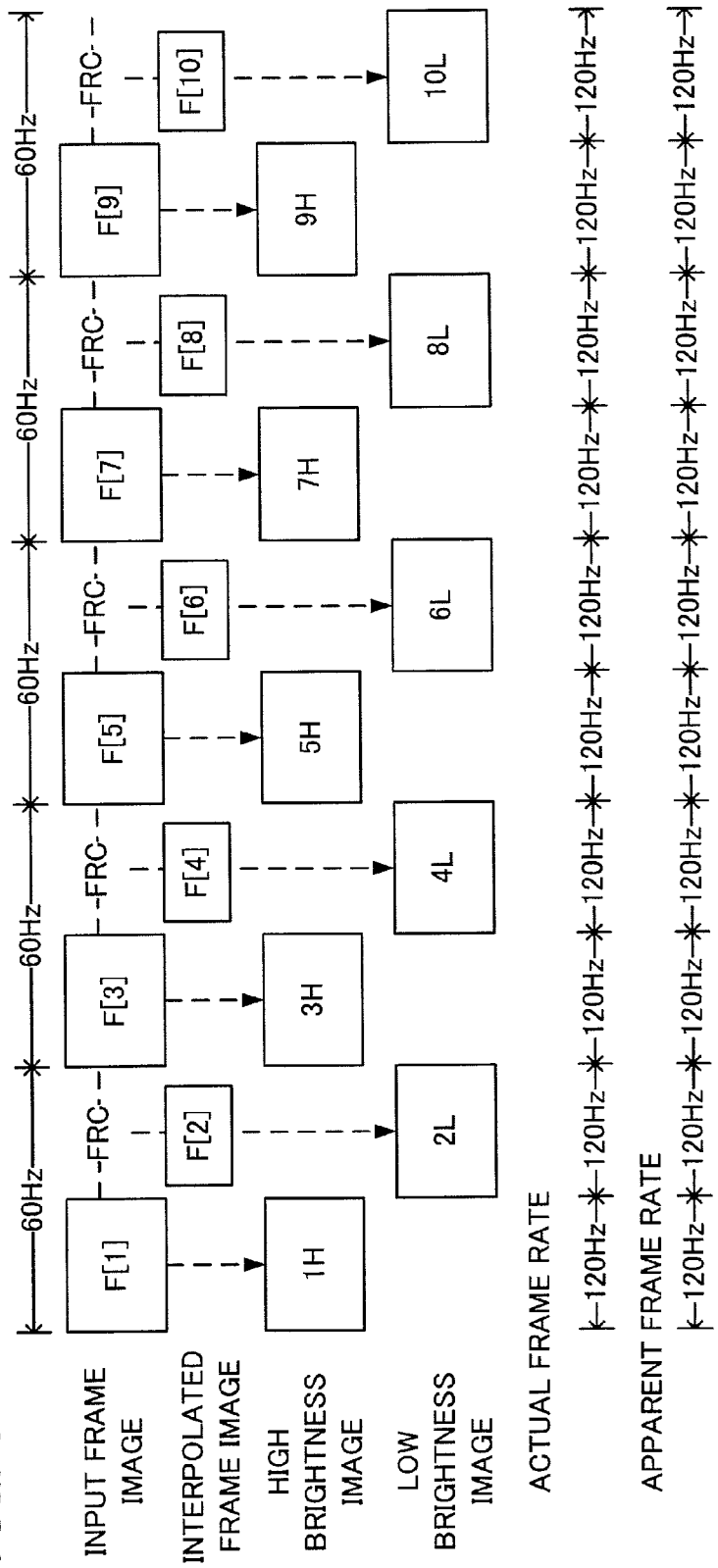
FIG. 3 is a diagram depicting an example of a series of processings by the image processing apparatus according to Example 1.

FIG. 3 shows an example of a series of processings (frame rate conversion processing, HDR video generation processing, video output processing) by the image processing apparatus according to this example. Here it is assumed that the i-th (i is 1 or greater integer) frame image (data), which is output from the frame rate conversion processor 103, is F[i].

As FIG. 3 shows, interpolated frame images F[2], F[4], F[6] . . . are generated using motion vectors detected from input frame images F[1], F[3], F[5] . . . . Then the input frame images F[1], F[3], F[5] . . . are converted into high brightness images 1H, 3H, 5H . . . and the interpolated frame images F[2], F[4], F[6] . . . are converted into low brightness images 2L, 4L, 6L, . . . . By this configuration, the apparent frame rate and the actual frame rate (120 Hz in the example in FIG. 3) can be matched, and the (apparent) dynamic range can be improved. Human eyes have low capability to detect noises and contours if an image is dark. Hence the interpolation errors (e.g. detection error of motion vectors) in the frame rate conversion processing can be less out standing by converting the interpolated frame image into a low brightness image.

As described above, according to this example, the dynamic range of the video after converting the frame rate can be improved without increasing the frame rate, using a simple configuration of converting an input frame image into a high brightness image, and converting an interpolated frame rate into a low brightness image. In other words, the dynamic range can be improved without increasing the frame rate using a configuration (frame memory, memory band) approximately the same as the case of performing only the frame rate conversion processing.

Example 2

An image processing apparatus and a control method thereof according to this example will now be described.

In this example, a configuration for generating an HDR video in an image processing apparatus in a system (a drive distribution system) of separating a frame image into a plurality of frame images (sub-frame images) having different spatial frequency values, and outputting the plurality of frame images, will be described.

(Configuration)

Figure 4:
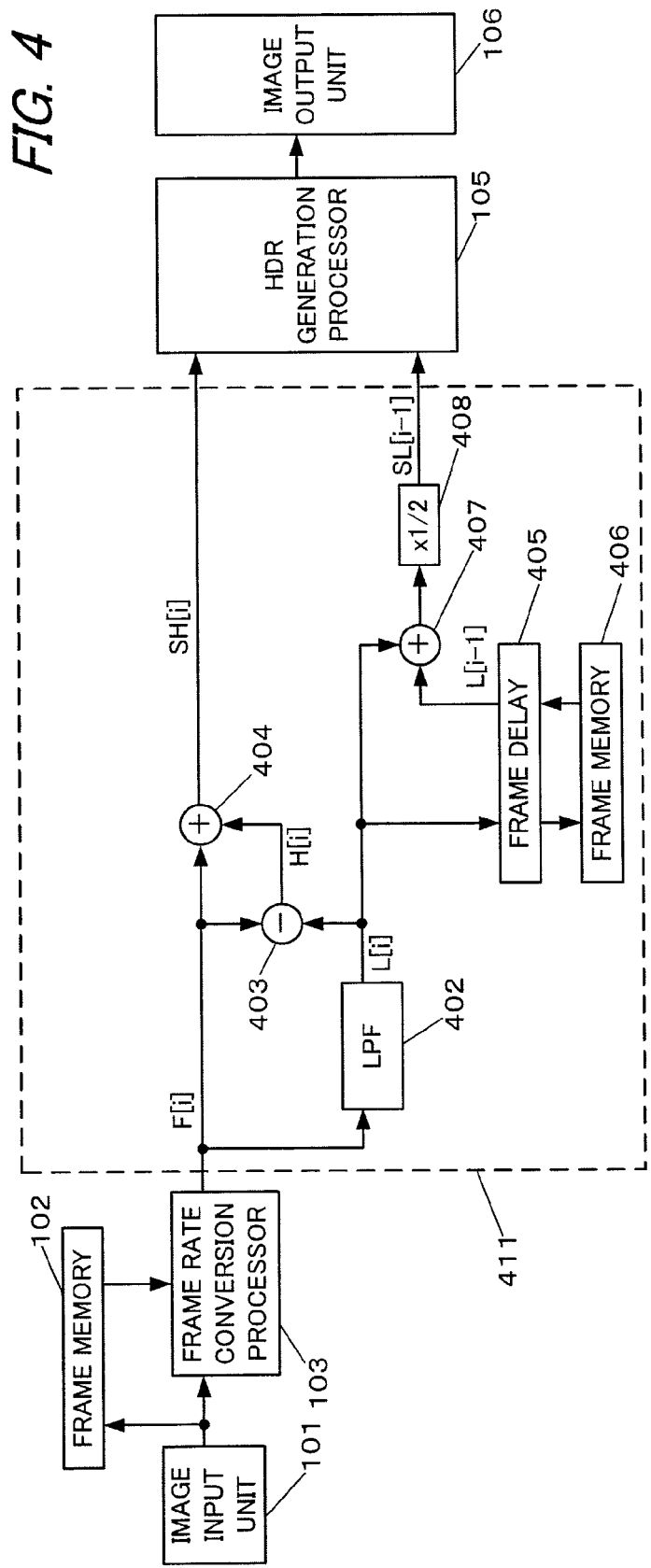
FIG. 4 is a diagram depicting an example of a configuration of an image processing apparatus according to Example 2.

FIG. 4 is a block diagram depicting an example of a general configuration of the image processing apparatus according to this example. The image processing apparatus according to this example has a drive distribution processor 411 in addition to the configuration of Example 1. Description on functions the same as Example 1 is omitted, and functions different from Example 1 will be described below.

The drive distribution processor 411 extracts high frequency components of an input frame image which is output from the frame rate conversion processor 103, so as to generate a high frequency component image, and extracts low frequency components of an interpolated frame image, so as to generate a low frequency component image (image processing unit). In this example, a high frequency component image is generated by enhancing the high frequency components of an input frame image which is output from the frame rate conversion processor 103 using the high frequency components extracted from the input frame image. Hereafter this high frequency component image is referred to as a "high frequency enhanced image". A low frequency component image is generated by averaging the low frequency components of an interpolated frame image which is output from the frame rate conversion processor 103, and the low frequency components of an input frame image in the subsequent frame of the interpolated frame image. Hereafter this low frequency component image is referred to as a "low frequency averaged image". The high frequency component image and the low frequency component image are not limited to this. For example, images expressed by high frequency components and low frequency components extracted from an input frame image (e.g. later mentioned H[i], L[i]) may be regarded as a high frequency component image and a low frequency component image. In this example, the high frequency components of the interpolated frame image are decreased, hence interpolation errors are not outstanding.

The HDR generation processor 105 performs processing to enhance gradation of an image in a high brightness area for a high frequency enhanced image, and performs processing to enhance gradation of an image in a low brightness area for a low frequency averaged image. In other words, a high frequency enhanced image is converted into a low brightness image, and a low frequency averaged image is converted into a high brightness image. A method for converting into a low brightness image or a high brightness image is the same as Example 1 , hence description thereof is omitted. A high frequency enhanced image is converted into a low brightness image in this example because if a high frequency enhanced image is converted into a high brightness image, the brightness value in a high frequency portion (the brightness value of an overshoot portion) may exceed a maximum value of possible brightness values. As mentioned above, low frequency components of an interpolated frame image are enhanced in this example, therefore interpolation errors are not outstanding very much, even if a low frequency averaged image generated from an interpolated frame image is not converted into a low brightness image.

Now a concrete configuration of the drive distribution processor 411 will be described.

In the following description, it is assumed that the i-th (i is 1 or greater integer) frame image (data), which is output from the frame rate conversion processor 103, is F[i].

A low pass filter (LPF) 402 is a two-dimensional low pass filter. This filter is not especially used for specifying functions. A frame image (data) L[i] (low frequency component) obtained by the processing of the LPF 402 is defined as follows.

$$L[i] = LPF[F[i]] \tag{Eq. 1}$$

A subtracter 403 subtracts a frame image L [i] from a frame image F[i], so as to calculate a frame image (data) H[i] (high frequency component).

$$H[i]=F[i]-L[i] \quad (\text{Eq. 2})$$

An adder 404 adds the frame image H[i] to the frame image F[i], so as to generate a high frequency enhanced image (data) SH[i] of which amount of high frequency components is spatially high. This adder 404, however, generates the high frequency enhanced image SH[i] only in the case when the frame image F[i] is an input frame image. In other words, if the frame image F[i] is an interpolated frame image, the high frequency enhanced image SH[i] is not generated.

$$SH[i]=F[i]+H[i]=L[i]+2\times H[i] \quad (\text{Eq. 3})$$

A frame delay 405 writes the frame image L[i] to a frame memory 406, and reads a frame image L[i−1] in the previous frame from the frame memory 406.

The frame memory 406 is a memory for storing a frame image, so that the frame image generated by the LPF 402 is delayed by one frame.

An adder 407 adds the frame image L[i−1] and the frame image L [i], which is a subsequent frame of the frame image L[i−1], and outputs the result. This adder 407 performs this addition processing only when the frame image L[i−1] is the low frequency components of an interpolated frame image. In other words, the addition processing is not performed if the frame image L[i−1] is the low frequency components of an input frame image.

A divider 408 generates a low frequency averaged image (data) SL[i−1] by dividing the frame image data, which is output from the adder 407, by 2. The low frequency averaged image SL[i−1] is generated only when the frame image L[i−1] is the low frequency components of an interpolated frame image. In other words, the low frequency averaged image SL[i−1] is not generated if the frame image L [i−1] is the low frequency components of an input frame image.

$$SL[i-1]=\{L[i-1]+L[i]\}/2 \quad (\text{Eq. 4})$$

The frame memories 102 and 406 may be a common memory.

(Low Frequency Averaged Image Generation Processing)

A processing flow until a low frequency averaged image is generated will be described with reference to the flow chart in FIG. 6.

First the LPF 402 generates a frame image L[i] by setting an upper limit of the spatial frequency for an input video (S601: filter processing).

Then the frame delay 405 writes the frame image L[i] to the frame memory 406 (S602: frame delay).

Then the frame delay 405 reads a frame image L[i−1], which is the previous frame, from the frame memory 406, and the adder 407 determines whether the frame image L[i−1] is the low frequency components of an interpolated frame image (S603). If the frame image L[i−1] is the low frequency components of an interpolated frame image (S603: YES), the adder 407 adds the frame image L[i−1] and the frame image L[i], and outputs the result. The processing then advances to S604. If the frame image L[i−1] is not the low frequency components of an interpolated frame image, that is, if the frame image L[i−1] is the low frequency components of an input frame image (non-interpolated frame image) (S603: NO), then the addition processing is not performed, and the low frequency averaged image generation processing ends. In other words, the low frequency averaged image SL[i] is not generated.

In S604, the divider 408 generates a low frequency averaged image SL[i] by dividing the data output from the adder 407 by 2 (average value calculation).

(High Frequency Enhanced Image Generation Processing)

A processing flow until a high frequency enhanced image is generated will be described with reference to the flow chart in FIG. 7.

First the subtracter 403 generates a frame image H[i] by subtracting a frame image L[i] from a frame image F[i] (S701: difference calculation).

Then the adder 404 determines whether the frame image F[i] is an input frame image (S702). If the frame image F[i] is an input frame image (non-interpolated image) (S702: YES), the adder 404 adds the frame image H[i] to the frame image F[i], so as to generate a high frequency enhanced image SH[i] (S703: difference addition). If the frame image F[i] is not an input frame image, that is, if the frame image F[i] is an interpolated frame image (S702: NO), the high frequency enhanced image SH[i] is not generated.

FIG. 8A shows an example of a brightness value of one line of an input frame image/interpolated frame image. FIG. 8B shows an example of a brightness value of one line of a low frequency averaged image SL[−1] generated for the interpolated frame image F[i−1] in FIG. 8A. FIG. 8C shows an example of a brightness value of one line of a high frequency enhanced image SH[i] generated for the input frame image F[i] in FIG. 8A.

(Generation of HDR Video)

Figure 5:
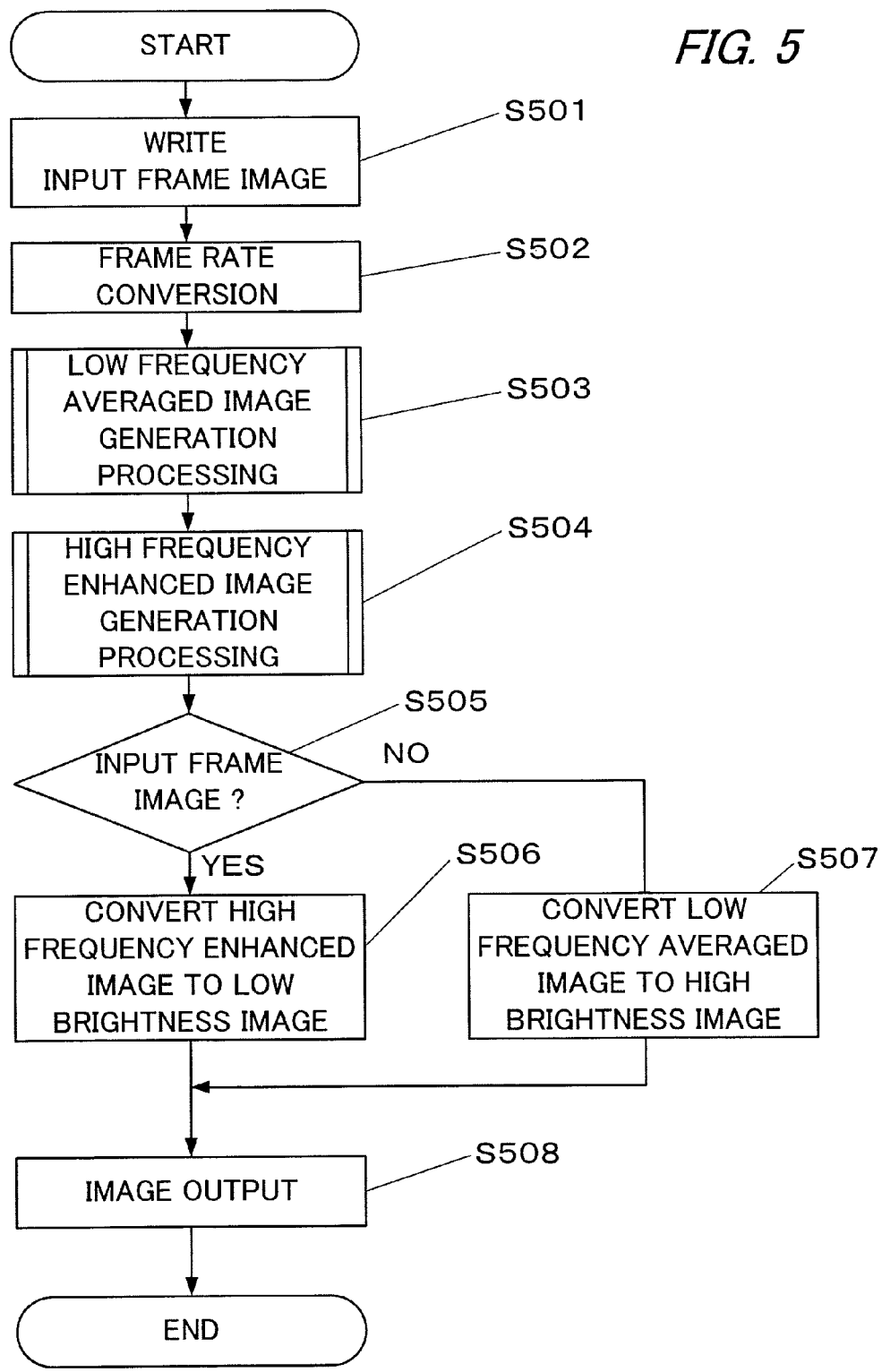
FIG. 5 is a flow chart depicting an example of a processing flow of the image processing apparatus according to Example 2.

A processing flow until an HDR video is generated will now be described with reference to the flow chart in FIG. 5.

First the image input unit 101 writes an input frame image to the frame memory 102, and outputs this input frame image to the frame rate conversion processor 103 (S501).

Then the frame rate conversion processor 103 detects a motion vector from the input frame image and an input frame image of the previous frame, which is read from the frame memory 102. Based on the detected motion vector, the frame rate conversion processor 103 generates an interpolated image, doubles the frame rates of the input frame image and the interpolated image, and alternately outputs the input frame image and the interpolated frame image to the drive distribution processor 411 (S502: frame rate conversion processing).

Figure 6:
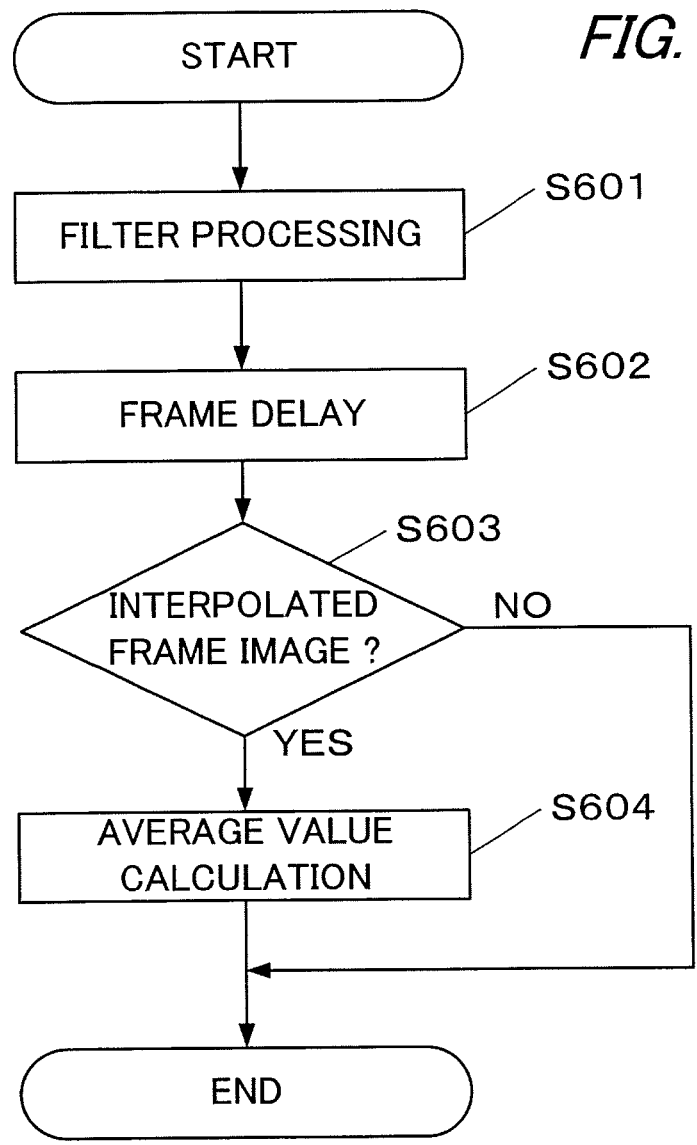
FIG. 6 is a flow chart depicting an example of a flow of a low frequency averaged image generation processing according to Example 2.

Then the drive distribution processor 411 performs the low frequency averaged image generation processing described in FIG. 6, and outputs the low frequency averaged image to the HDR generation processor 105 (S503).

Figure 7:
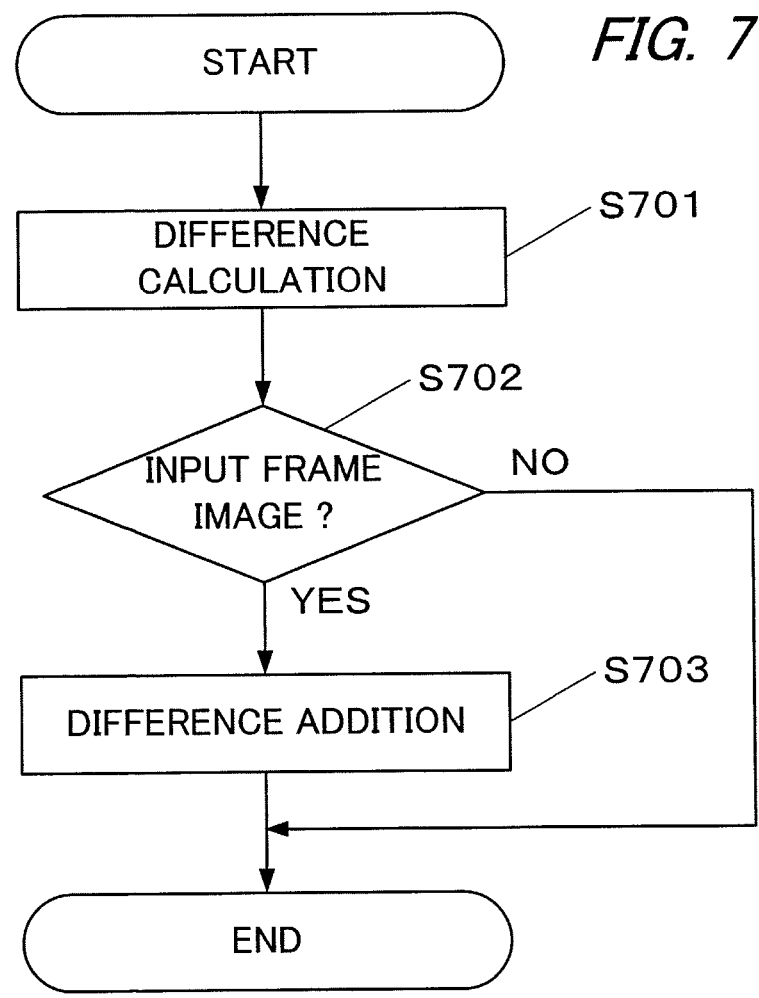
FIG. 7 is a flow chart depicting an example of a flow of a high frequency enhanced image generation processing according to Example 2.
Figure 12:
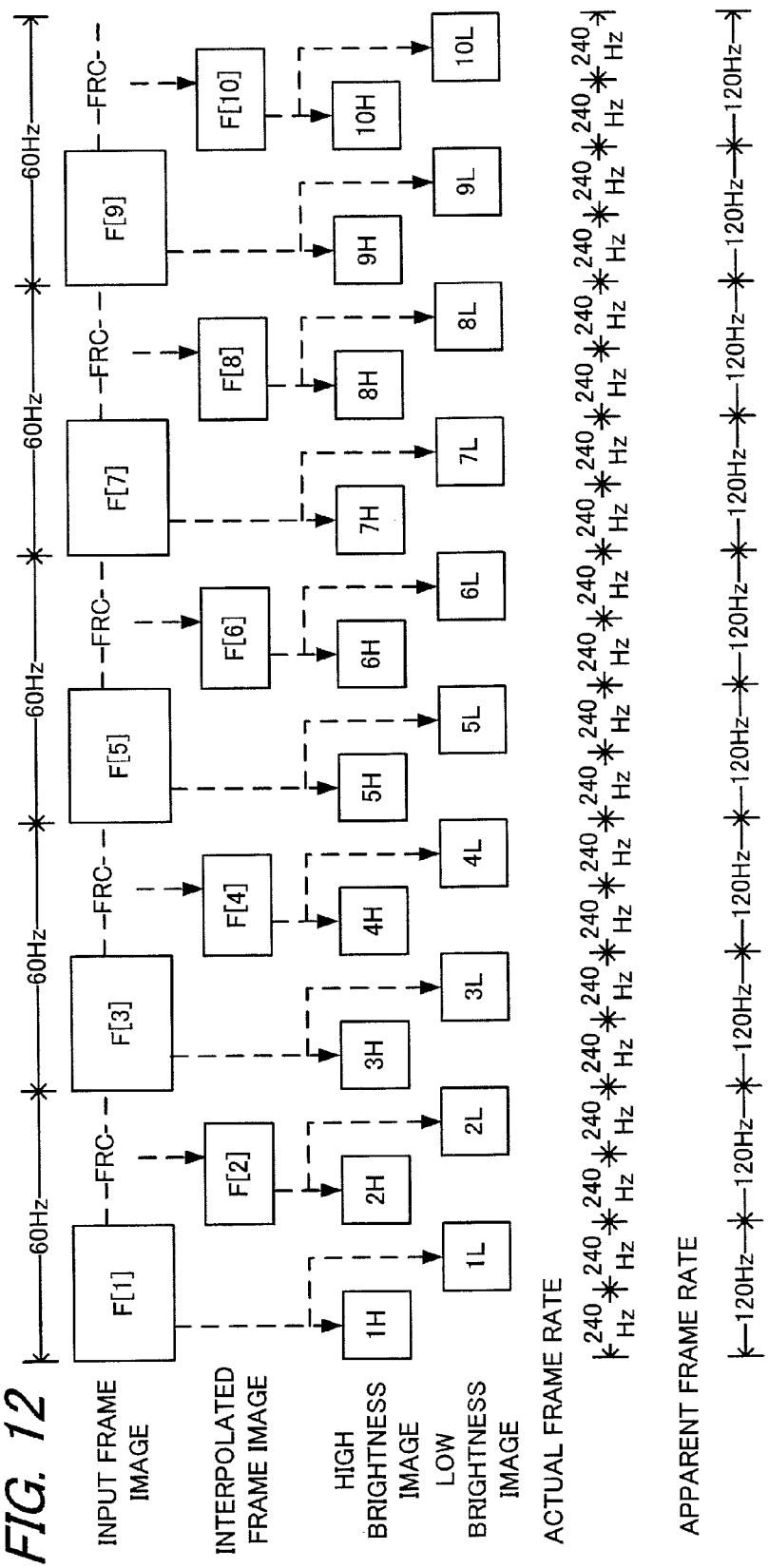
FIG. 12 is a diagram depicting a problem of the present invention.

Then the drive distribution processor 411 performs the high frequency enhanced image generation processing described in FIG. 7, and outputs the high frequency enhanced image to the HDR generation processor 105 (S504). The processing in S503 and S504 is referred to as "drive distribution processing".

Then the HDR generation processor 105 determines whether an original frame image of the frame image which was input (high frequency enhanced image and low frequency averaged image) is an input frame image or an interpolated frame image (S505).

If an original frame image of a frame image which is output from the drive distribution processor 411 is an input frame image (non-interpolated frame image) (S505: YES), the high frequency enhanced image which was input is converted into a low brightness image, and is output to the image output unit 106 (S506). A lookup table (LUT) as shown in the example in FIG. 13A is used for conversion into a low brightness image.

If an original frame image of a frame image, which is output from the drive distribution processor 411, is an interpolated frame image (S505: NO), the low frequency averaged image which was input is converted into a high brightness image, and is output to the image output unit 106 (S507). A lookup table (LUT) as shown in the example in FIG. 13B is used for conversion into a high brightness image. The processing in S506 and S507 is referred to as "HDR video generation processing".

Then the image output unit 106 outputs the images generated in the HDR generation processor 105 (high brightness image, low brightness image) to another image processing apparatus, a display apparatus, and such a storage unit as a memory (S508: video output processing). The dynamic range of the input video apparently improves by the image output unit 106 alternately outputting the high brightness image and the low brightness image generated by the HDR generation processor 105, and the display apparatus (display unit) displaying these images.

FIG. 9A shows an example of a low frequency averaged image and a high brightness image generated from this image. FIG. 9B shows an example of a high frequency enhanced image and a low brightness image generated from this image. As FIG. 9B shows, a high frequency enhanced image includes an overshoot portion, therefore a configuration to generate a low brightness image from a high frequency enhanced image is used. As FIG. 9B shows, the overshoot portion of the brightness value in the high frequency portion (edge portion) can be expressed by converting the high frequency enhanced image into a low brightness image.

FIG. 10 shows an example of a series of processings (frame rate conversion, drive distribution processing, HDR video generation processing, video output processing) by the image processing apparatus according to this example.

As FIG. 10 shows, according to this example, a high frequency enhanced image generated from an input frame image is converted into a low brightness image (L), and a low frequency averaged image generated from an interpolated frame image is converted into a high brightness image (H) in the drive distribution type image processing apparatus. By this configuration, the apparent frame rate and the actual frame rate (120 Hz in the example of FIG. 10) can be matched, and dynamic range can be improved. By generating a low frequency averaged image from an interpolated frame image, interpolation errors can be less outstanding.

As described above, according to this example, effects similar to Example 1 can be obtained in a drive distribution type image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-089302 , filed on Apr. 8, 2010, and Japanese Patent Application No. 2011-004708 , filed on Jan. 13, 2011 , which are hereby incorporated by reference herein in their entirety.

What is claimed is:

1. An image processing apparatus, comprising:
a frame rate conversion processor that generates an interpolated frame image which interpolates an input frame image constituting an input video, and outputs the input frame image and the interpolated frame image alternately; and
a high dynamic range (HDR) processor that performs processing to increase the brightness of the input frame image which is output from the frame rate conversion processor by converting gradation in use of a lookup table for enhancing gradation in a low brightness area, and performs processing to decrease the brightness of the interpolated frame image which is output from the frame rate conversion processor by converting gradation in use of a lookup table for enhancing gradation in a high brightness area,
wherein the low brightness area is an area of an image having a lower than or equal to a first predetermined brightness value and the high brightness area is an area of an image having a higher than or equal to a second predetermined brightness value.

2. The image processing apparatus according to claim 1, wherein the frame rate conversion processor detects a motion vector from an input frame image constituting the input video, and generates an interpolated frame image which interpolates two input frame images in use of the detected motion vector.

3. The image processing apparatus according to claim 1, wherein the input frame image for which the processing to increase the brightness has been performed by the HDR processor, and the interpolated frame image for which the processing to decrease the brightness has been performed by the HDR processor are alternately output to a display.

4. The image processing apparatus in accordance with claim 1, wherein the HDR processor determines whether an image frame is the input frame image which is output from the frame rate conversion processor or the interpolated frame image which is output from the frame rate conversion processor based on identification information superposed on the image frame, and performs the processing to increase or decrease the brightness based on the determination.

5. An image processing apparatus, comprising:
a frame rate conversion processor that generates an interpolated frame image which interpolates an input frame image constituting an input video, and alternately outputs the input frame image and the interpolated frame image;
an image processor that extracts high frequency components of the input frame image which is output from the frame rate conversion processor in order to generate a high frequency component image, and extracts low frequency components of the interpolated frame image which is output from the frame rate conversion processor in order to generate a low frequency component image; and
a high dynamic range (HDR) processor that performs processing to decrease the brightness of the high frequency component image which is generated by the image processor, and performs processing to increase the brightness of the low frequency component image which is generated by the image processor.

6. The image processing apparatus according to claim 5, wherein
the image processor generates the high frequency component image by enhancing the high frequency components of the input frame image which is output from the frame rate conversion processor in use of the high frequency components extracted from the input frame image, and
generates the low frequency component image by averaging the low frequency components of the interpolated frame image which is output from the frame rate conversion processor and the low frequency components of the input frame image in the subsequent frame of the interpolated frame image.

7. The image processing apparatus according to claim 5, wherein the frame rate conversion processor detects a motion vector from an input frame image constituting the input video, and generates an interpolated frame image which interpolates two input frame images in use of the detected motion vector.

8. The image processing apparatus according to claim 5, wherein
the HDR processor performs processing to decrease the brightness of the high frequency component image by converting gradation in use of a lookup table for enhancing gradation of an image in the a high brightness area, and performs processing to increase the brightness of the low frequency component image by converting gradation in use of a lookup table for enhancing gradation of an image in a low brightness area.

9. The image processing apparatus according to claim 5, wherein the high frequency component image for which the processing to decrease the brightness has been performed by the HDR processor, and the low frequency component image for which the processing to increase the brightness has been performed by the HDR processor are alternately output to a display.

10. A method for controlling an image processing apparatus, comprising:
a frame rate conversion step of generating an interpolated frame image which interpolates an input frame image constituting an input video, and alternately outputting the input frame image and the interpolated frame image; and
a processing step of performing processing to increase the brightness of the input frame image which is output in the frame rate conversion step by converting gradation in use of a lookup table for enhancing gradation in a low brightness area, and performing processing to decrease the brightness of the interpolated frame image by converting gradation in use of a lookup table for enhancing gradation in a high brightness area,
wherein the low brightness area is an area of an image having a lower than or equal to a first predetermined brightness value and the high brightness area is an area of an image having a higher than or equal to a second predetermined brightness value.

11. The method for controlling an image processing apparatus according to claim 10, wherein
in the frame rate conversion step, a motion vector is detected from an input frame image constituting the input video, and an interpolated frame image which interpolates two input frame images is generated in use of the detected motion vector.

12. The method for controlling an image processing apparatus according to claim 10, further comprising an image output step of alternately outputting, to a display unit, the input frame image for which the processing to increase the brightness has been performed by the processing step, and the interpolated frame image for which the processing to decrease the brightness has been performed by the processing step.

13. The method of claim 10, further comprising a determining step of determining whether an image frame is an input frame image is the input frame image which is output from the frame rate conversion unit or the interpolated frame image which is output from the frame rate conversion unit based on identification information superposed on the image frame,
wherein the processing step to increase or decrease the brightness is performed based on the result of the determining step.

14. A method for controlling an image processing apparatus, comprising:
a frame rate conversion step of generating an interpolated frame image which interpolates an input frame image constituting an input video, and alternately outputting the input frame image and the interpolated frame image;
a first processing step of extracting high frequency components of the input frame image which is output in the frame rate conversion step in order to generate a high frequency component image, and extracting low frequency components of the interpolated frame image which is output in the frame rate conversion step in order to generate a low frequency component image; and
a second processing step of performing processing to decrease the brightness of the high frequency component image which is generated by the first processing step, and performing processing to increase the brightness of the low frequency component image which is generated by the first processing step.

15. The method for controlling an image processing apparatus according to claim 14, wherein
in the first processing step, the high frequency component image is generated by enhancing high frequency components of the input frame image which is output in the frame rate conversion step in use of high frequency components extracted from the input frame image, and the low frequency component image is generated by averaging low frequency components of the interpolated frame image which is output in the frame rate conversion step and low frequency components of the input frame image in the subsequent frame of the interpolated frame image.

16. The method for controlling an image processing apparatus according to claim 14, wherein
in the frame rate conversion step, a motion vector is detected from an input frame image constituting the input video, and an interpolated frame image which interpolates two input frame images is generated in use of the detected motion vector.

17. The method for controlling an image processing apparatus according to claim 14, wherein
in the second processing step, processing to decrease the brightness of the high frequency component image is performed by converting gradation in use of a lookup table for enhancing gradation of an image in a high brightness area, and processing to increase the brightness of the low frequency component image is performed by converting gradation in use of a lookup table for enhancing gradation of an image in a low brightness area.

18. The method for controlling an image processing apparatus according to claim 14, further comprising an image output step of alternately outputting, to a display unit, the high frequency component image for which the processing to decrease the brightness has been performed by the second processing step, and the low frequency component image for which the processing to increase the brightness has been performed by the second processing step.

* * * * *